United States Patent [19]

VanDeMoere

[11] Patent Number: 5,294,953
[45] Date of Patent: Mar. 15, 1994

[54] CAMERA-TO SUBJECT DISTANCE DETERMINING APPARATUS AND METHOD

[75] Inventor: Alan V. VanDeMoere, Rochester, N.Y.

[73] Assignee: Eastman Kodak Company, Rochester, N.Y.

[21] Appl. No.: 3,033

[22] Filed: Jan. 13, 1993

[51] Int. Cl.⁵ .............................................. G03B 13/02
[52] U.S. Cl. ...................................... 354/219; 354/222
[58] Field of Search ................ 354/219, 220, 221, 222

[56] References Cited

U.S. PATENT DOCUMENTS

| | | | |
|---|---|---|---|
| 926,912 | 7/1909 | Vogt et al. | 354/163 |
| 3,330,194 | 7/1967 | Dietz et al. | 354/221 |
| 3,699,867 | 10/1972 | Wolbarst | 354/221 |
| 3,727,530 | 4/1973 | Aoki | 354/199 |
| 4,011,571 | 3/1977 | Okuzawa | 354/219 |

Primary Examiner—David M. Gray
Attorney, Agent, or Firm—Roger A. Fields

[57] ABSTRACT

A method and an apparatus are disclosed for bringing a portrait camera having a fixed-focus taking lens into coincidence with an optimum camera-to-subject distance appropriate for the lens regardless of differences in the size of a person's head to be photographed. According to the invention, a finder frame through which a person's head may be viewed can be set to one of several alternative settings corresponding to respective head sizes, for example small, medium and large, to select the particular setting that best matches the size of a person's head to be photographed at the optimum camera-to-subject distance. Then, the specific distance between the portrait camera and the person's head to be photographed is adjusted until the person's head, when viewed through the finder frame, appears to fill the finder frame.

3 Claims, 1 Drawing Sheet

CAMERA-TO SUBJECT DISTANCE DETERMINING APPARATUS AND METHOD

BACKGROUND OF THE INVENTION

1. Field of the Invention

The invention relates generally to the field of photography and particularly to a camera-to-subject distance determining apparatus and method appropriate for a fixed-focus taking lens.

2. Description of the Prior Art

Prior art U.S. Pat. No. 3,699,867, issued Oct. 24, 1972, discloses a method of bringing a flash-type camera having a fixed-focus taking lens into coincidence with an optimum camera-to-subject distance appropriate for the fixed-focus taking lens during flash photography. To achieve this purpose, the patent explains that the human head is the most commonly encountered photographic subject in flash photography and, therefore, takes note of the vertical dimension (height) of a normal size adult head from the top of the head to the bottom of the chin. In one embodiment, a fixed finder frame for the camera viewfinder is dimensioned to view a normal size adult head. While viewing the head of any subject to be photographed, the specific distance between the camera and the subject is adjusted by moving the subject or the camera until the head of the subject appears to fill the finder frame. At this time, it is stated the optimum camera-to subject distance is established.

PROBLEM TO BE SOLVED BY THE INVENTION

Prior art U.S. Pat. No. 3,699,867 fails to take into account that human heads vary in size, particularly as a function of age. Instead, the finder frame is dimensioned for viewing only a normal size adult head.

If the camera is used to take a picture of an infant, for example, the camera will be closer to the subject than the optimum camera-to-subject distance when the infant's head appears to fill the finder frame. Thus, the optimum camera-to-subject distance will not be realized.

SUMMARY OF THE INVENTION

In one mode, the invention is a method of bringing a portrait camera having a fixed-focus taking lens into coincidence with an optimum camera-to-subject distance appropriate for the fixed-focus taking lens regardless of differences in the size of a person's head to be photographed. The method comprises the following steps:

setting a finder frame through which a person's head may be viewed to one of several alternative settings corresponding to respective head sizes, for example small, medium and large, to select the particular setting that best matches the size of a person's head to be photographed at the optimum camera-to-subject distance; and adjusting the specific distance between the portrait camera and a person's head to be photographed until the person's head, when viewed through the finder frame, appears to fill the finder frame to thereby bring the portrait camera into coincidence with the optimum camera-to subject distance.

In another mode, the invention is a portrait camera for taking a picture of a person's head. The portrait camera comprises a fixed-focus taking lens preferably to be used at an optimum camera-to subject distance and a finder frame through which the person's head may be viewed, and is characterized by:

setting means for setting the finder frame to one of several alternative settings corresponding to respective head sizes, for example small, medium and large, to select the particular setting that best matches the size of a person's head to be photographed at the optimum camera-to-subject distance, whereby the portrait camera can be brought into coincidence with the optimum camera-to subject distance by adjusting the specific distance between the portrait camera and the person's head to be photographed until the person's head, when viewed through the finder frame, appears to fill the finder frame.

DETAILED DESCRIPTION OF THE PREFERRED EMBODIMENT

Figure 1:
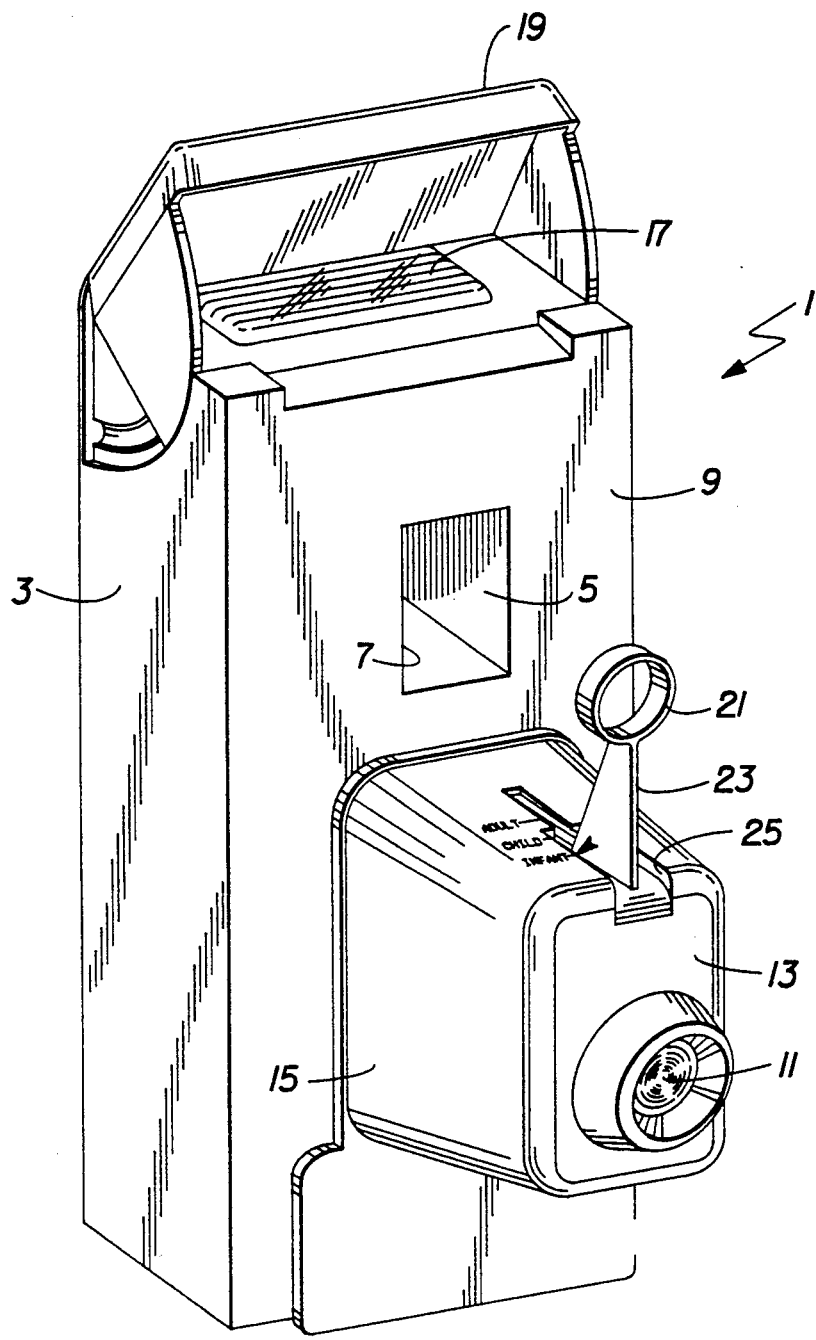
FIG. 1 is a front perspective view of a portrait camera according to a preferred embodiment of the invention.

The invention is disclosed in connection with a 35 mm still camera having a built-in electronic flash unit. Because such a camera is widely known, this description is directed to photographic elements forming part of or cooperating directly with the invention. It is to be understood, however, that other elements not specifically shown or described may take various forms known to persons of ordinary skill in the art.

Referring now to the drawing, FIG. 1 depicts a portrait camera 1 wherein a camera body 3 includes a direct see-through viewfinder tunnel 5 having a front rectangular opening 7 at a front face 9 of the camera body and a smaller rear rectangular opening at a rear face, not shown, of the camera body. A conventional fixed-focus lens 11 is mounted substantially at a forward end 13 of a lens snout 15 that longitudinally projects from the front face 9 of the camera body 3. A conventional electronic flash unit, not shown, is located underneath a flash emission window 17 at one end of the camera body 3 which in turn, is located underneath a flash reflector/window cover 19. The reflector/cover 19 is pivotally supported via common means on the camera body 3 for movement between a cover position on top of the window 17 and a reflecting position as shown in FIG. 1.

According to the invention, a finder frame in the form of a head-finder circle 21 is intended to be visible, when one looks through the viewfinder tunnel 5 at its rear opening, to frame the head of a person to be photographed. The head-finder circle 21 has an integral stem 23 that sits in a channel 25 cut in the lens snout 15 to support the circle for movement towards and away from the front window 7 of the viewfinder tunnel 5 between three alternative settings "ADULT", "CHILD", and "INFANT" to manually select the particular setting that best matches the size of a person's head to be photographed.

To use the portrait camera 1, the photographer first sets the header-finder circle 21 to the correct setting, "ADULT", "CHILD", or "INFANT". Then, the photographer looks through the viewfinder tunnel 5 to view the person's head through the circle 21. Finally, the specific distance between the portrait camera 1 and the person's head is adjusted by moving the person's head or the camera until the person's head (be it an adult's, a child's or an infant's) fills the circle 21. At this time, the portrait camera 1 is located in coincidence with an optimum camera-to- subject distance appropriate for the fixed-focus taking lens 11.

Preferably, the taking lens is 83 mm and the optimum camera-to subject distance (regardless of differences in the size of a person's head to be photographed) is 72 inches.

The invention has been described with reference to a preferred embodiment. However, it will be appreciated that variations and modifications can be effected within the ordinary skill in the art without departing from the scope of the invention.

I claim:

1. A method of bringing a portrait camera having a fixed-focus taking lens into coincidence with an optimum camera-to-subject distance appropriate for the fixed-focus taking lens regardless of differences in the size of a person's head to be photographed, said method comprising:

setting a finder frame through which a person's head may be viewed to one of several alternative settings corresponding to respective head sizes, for example small, medium and large, to select the particular setting that best matches the size of a person's head to be photographed at the optimum camera-to-subject distance; and adjusting the specific distance between the portrait camera and a person's head to be photographed until the person's head, when viewed through the finder frame, appears to fill the finder frame to thereby bring the portrait camera into coincidence with the optimum camera-to subject distance.

2. A portrait camera for taking a picture of a person's head comprises a fixed-focus taking lens preferably to be used at an optimum camera-to subject distance and a finder frame through which the person's head may be viewed, and is characterized by:

setting means for setting said finder frame to one of several alternative settings corresponding to respective head sizes, for example small, medium and large, to select the particular setting that best matches the size of a person's head to be photographed at the optimum camera-to-subject distance, whereby said portrait camera can be brought into coincidence with the optimum camera-to subject distance by adjusting the specific distance between the portrait camera and the person's head to be photographed until the person's head, when viewed through said finder frame, appears to fill the finder frame.

3. A portrait camera as recited in claim 2, wherein said fixed-focus taking lens is mounted substantially at a forward end of a lens snout that longitudinally projects from a front face of a camera body, a viewfinder opening is formed in said front face of the camera body, and said setting means includes support means supporting said finder frame for movement along said lens snout towards and away from said viewfinder opening to the alternative settings.

* * * * *